Feb. 2, 1954  N. I. KONWAL  2,668,034
VALVE
Filed Oct. 18, 1950

Inventor
NICK I KONWAL
by  Attys

Patented Feb. 2, 1954

2,668,034

UNITED STATES PATENT OFFICE 2,668,034

VALVE

Nick I. Konwal, Cicero, Ill., assignor to Cyrus Shank Company, Chicago, Ill., a corporation of Illinois Application October 18, 1950, Serial No. 190,838

2 Claims. (Cl. 251—32)

This invention relates in general to a valve construction and is more particularly concerned with the type of valve having a forward seating valve and a back seating valve.

The valve of this invention provides a novel arrangement in a back seating valve structure wherein a back seat retaining member is formed initially of a ring having an outer straight cylindrical wall. The ring is made of suitable material and is positioned in the bore of the body of the valve. For holding or securing the retaining ring in the bore of the body of the valve permanently, the ring is outwardly swaged into a preformed annular groove in the bore by a suitable tool such as a spreading tool or punch having a tapered end portion.

It is to be noted that the back seat retaining member does not threadably engage the body of the valve, but is secured in place in a preformed groove therein. This provides a valve structure that is economical and easy to manufacture without sacrificing durability and sturdiness. The back seating valve member and the retaining member are permanently secured to the body member so as to provide an improved sealing arrangement. Further, such an arrangement provides a back seating valve member that is not readily loosened by excessive vibrations.

Accordingly, an object of the present invention is to provide a valve structure having a forward seating valve and a back seating valve wherein the back seat is held in place in the bore of the body of the valve by a retaining member that has been outwardly deformed to fit into an annular groove preformed in the wall of the bore.

Another object of the present invention is to provide an economical method of making a back seating valve assembly.

Another object of the present invention is to provide a back seating valve structure which is strong, sturdy and durable, which is economical and easy to manufacture, which is efficient and leak-proof.

Another object of the present invention is to provide a back seating valve structure that has an improved sealing arrangement characterized by the use of a back valve seat retainer that is permanently secured to the body member.

Another object of the present invention is to provide a back seating valve structure in which the back valve seat cannot be readily loosened by excessive vibrations.

Other objects and advantages of the invention will become apparent from the following detailed description taken in connection with the accompanying drawings.

Figure 1:
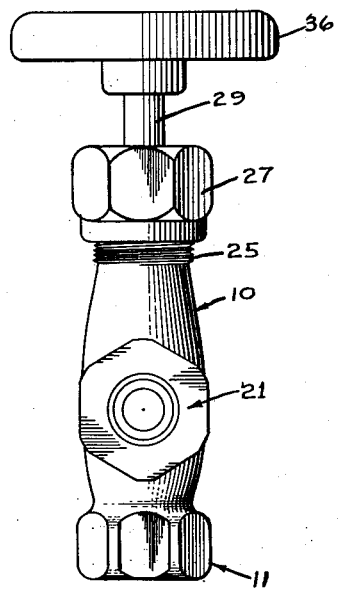
Figure 1 is a perspective view of a valve embodying the present invention.
Figure 2:
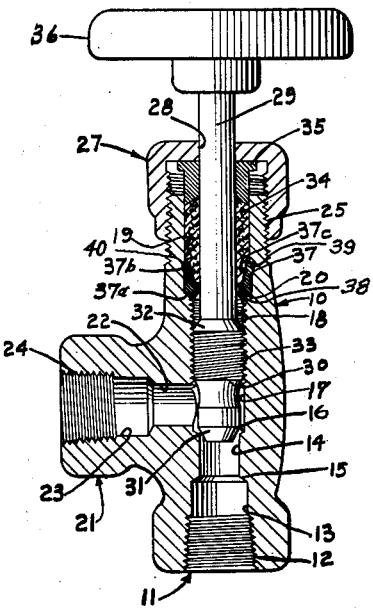
Figure 2 is a vertical sectional view of the valve embodying the present invention.
Figure 4:
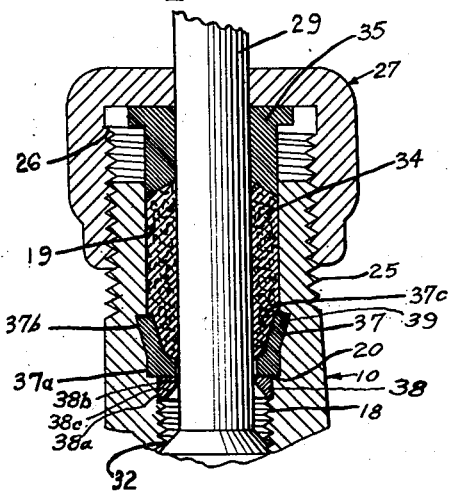
Figure 3:
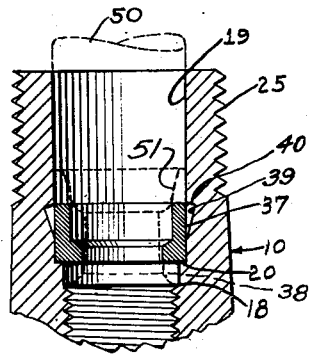

Figure 3 is an enlarged fragmentary sectional view particularly illustrating the ring forming the retaining member for the back seat as it appears initially; and Figure 4 is an enlarged fragmentary sectional view of the valve shown in Figure 2 and particularly illustrating the retaining ring outwardly swaged into an annular groove of the bore of the body of the valve to secure the back seat of the valve.

As shown on the drawings:

The valve of my invention comprises a valve body 10 of suitable material having a stepped cylindrical axial bore therethrough, the lower end of which is counterbored, as at 13 and provided with threads 12 to constitute an inlet 11 for connection in a pipe line. A smooth bore portion 14 of decreased diameter extends inwardly of the counterbore 13, with an inclined shoulder 15 therebetween.

A forward valve seat is provided by an annular inclined shoulder 16, formed at the junction between the bore portion 14 and an adjoining cylindrical bore portion 17 of increased diameter. The upper portion of the bore 17 is threaded, as at 18. At the upper end of the threaded portion 18, an increased diameter bore 19 provides a plane annular rearwardly facing shoulder 20. An annular groove 39 is formed in the bore 19 having an outwardly tapered portion forming an annular forwardly facing shoulder 40 for a purpose that will later appear.

The valve body 10 is also formed with a lateral discharge or outlet 21 having a counterbore 23 threaded as at 24 and communicating with the bore portion 17 through a reduced diameter passage 22.

The upper portion 25 of the valve body 10 is externally threaded for receiving an internally threaded cap 27. A central aperture 28 is provided in the cap 27 for freely passing a valve stem 29.

The valve stem 29 is a cylindrical rod extending through the bore portions 17 and 19 of the valve body 10 and has an integral enlargement 30 terminating at its lower end in a frusto-conical portion forming a forward valve 31. The largest diameter of the valve 31 is larger than the diameter of the bore portion 14, but smaller than the diameter of the bore portion 17, thereby serving as a forward valve for seating against the seat 16. A similar frusto-conical portion at the upper end of the enlargement 30 provides a back valve 32.

An intermediate portion of the integral enlargement 30 is threaded, as at 33, for engagement with internal threads 18 of the bore 17 to move the stem axially when its handle 36 is turned.

Packing 34 is held in position about the upper portion of the stem 29 by a smooth-surfaced packing gland 35 surrounding the stem 29 and freely slidable in the upper portion of the bore 19. By screwing the cap 27 down tightly against the upper end of the packing gland 35 the packing 34 is maintained under compression, sealing the upper end of the bore.

In accordance to one embodiment of my invention, a retaining ring 37 or back valve seat member having an inside diameter greater than that of the stem 29 is positioned against the annular shoulder 20 to provide a back seat for the back valve 32. Initially, the retaining ring 37 is of generally cylindrical shape, as shown in Figure 3. For permanently securing the retaining ring 37 in place against the rearwardly facing shoulder 20, the upper portion of periphery of the retaining ring 37 is outwardly swaged into the annular groove 39 by means of a suitable tool, such as a spreading tool or a punch 50 provided with a tapered end portion 51. The annular groove 39 has an outwardly tapered portion adjacent the forwardly facing shoulder 40. Thereupon, the back valve seat assumes the shape shown in Figure 4.

When permanently secured in the valve body 10, the back valve seat retaining member 37 has a generally cylindrical lower end portion 37a filling the bore portion 19 and seated on the annular rearwardly facing shoulder 20. An upper peripheral flange portion 37b of the ring 37 is deformed outwardly into the preformed groove 39 of the valve body 10 to insure permanent securement thereto. The inner surface 37c of the valve seat retaining member 37 is generally cup-shaped.

In another embodiment of the present invention, a back valve seat assembly is provided having a back seat member 38 which is positioned above the threaded portion 18, against the lower end of the retaining ring 37. Initially, the seat member 38 is formed of a ring having an outer straight cylindrical wall 38a and an inner straight cylindrical wall 38b, as shown in Figure 3. The outer wall 38a has a diameter equal to the root diameter of the threaded portion 18 and the inner wall has a diameter of appropriate size for receiving the valve stem 29.

The back seat member 38 is secured in position by seating the retaining ring 37 on the rearwardly facing shoulder 20 in abutting contact with the seat 38 and outwardly swaging the upper peripheral portion of the retaining ring 37 into the groove 39, in a manner previously described.

After the back seat member 38 is secured in place by the back seat retaining ring 37, the valve stem 29 is raised to deform the inner wall 38b. The frusto-conical portion 32 of the valve stem 29 deforms the inner wall 38b to provide an inclined inner wall 38c, as shown in Fig. 4, conforming to the contour of the frusto-conical end portion 32, thereby forming the seat for the back seating valve 32.

The back valve seat thus provided is permanently secured to the body member, thereby providing a seat that is not readily loosened by excessive vibrations. Further, it is to be noted that the valve structure may be manufactured economically.

It will be understood that modifications and variations may be effected without departing from the scope of the novel concepts of the present invention.

I claim as my invention:

1. In a valve structure having a forward seating and back seating valve, a body having a cylindrical bore provided with a rearwardly facing shoulder, and an annular groove forming a forwardly facing annular shoulder, an annular back valve seat comprising a ring in abutting contact with said forwardly facing shoulder and having a rearward groove abutting edge and an outer periphery extending radially outwardly into said groove to permanently retain said ring against said rearwardly facing shoulder and an inner periphery which is tapered to provide a packing compression surface, and a stem movable in said bore and having a valve for seating against the forward edge of said back valve seat to prevent movement of fluid through said bore past said back valve seat when said forward seating valve is in a wide open position.

2. In a valve of the type having a forward seating valve and a back seating valve, a body member having a bore therein, the wall of said bore providing a forward valve seat shoulder, a forwardly facing back shoulder formed by the rear edge of an annular groove in said bore, a back seat member in said bore, a back seat retaining member having a forward edge providing an abutment for said back seat member and having a peripheral flange projecting outwardly into said groove so that the rear edge of said retaining member abuts said forwardly facing back shoulder thereby permanently retaining said back seat member in position, and a stem extending through said bore, back seat member and retaining member and having first and second frusto conical portions for seating respectively on said forward shoulder to provide a forward seating valve and on said back seat member to provide a back seating valve, the inner surface of the said projecting flange forming a tapered recess between the stem and said retaining member for receiving valve packing material about the stem and causing the packing material to tightly grip the stem.

NICK I. KONWAL.

References Cited in the file of this patent

UNITED STATES PATENTS

| Number | Name | Date |
|---|---|---|
| 1,546,106 | Rice | July 14, 1925 |
| 1,569,245 | Willgoos | Jan. 12, 1926 |
| 1,733,421 | Mauran | Oct. 29, 1929 |
| 1,944,428 | Hammon | Jan. 23, 1934 |
| 2,042,845 | Henry | June 2, 1936 |
| 2,121,464 | Zagorski | June 21, 1938 |
| 2,429,778 | Stancliff | Oct. 28, 1947 |

FOREIGN PATENTS

| Number | Country | Date |
|---|---|---|
| 80,657 | Sweden | of 1934 |